United States Patent [19]

Sakai et al.

[11] Patent Number: 5,053,598
[45] Date of Patent: Oct. 1, 1991

[54] WIRE ELECTRODE FEEDING APPARATUS

[75] Inventors: Akihiro Sakai; Masanori Suzuki, both of Nagoya, Japan

[73] Assignee: Mitsubishi Denki K.K., Tokyo, Japan

[21] Appl. No.: 510,632

[22] Filed: Apr. 18, 1990

[30] Foreign Application Priority Data

Apr. 28, 1989 [JP] Japan .................................. 1-111702

[51] Int. Cl.[5] ............................................ B23H 7/10
[52] U.S. Cl. ............................................... 219/69.12
[58] Field of Search ................. 219/69.12, 69.2, 69.13, 219/69.17, 137.7

[56] References Cited

U.S. PATENT DOCUMENTS 4,929,810  5/1990  Kawase ........................... 219/69.12

FOREIGN PATENT DOCUMENTS 232830  11/1985  Japan .
162425   7/1987  Japan ................................. 219/69.2
64-11732 1/1989  Japan ................................. 219/69.2

Primary Examiner—Geoffrey S. Evans
Attorney, Agent, or Firm—Sughrue, Mion, Zinn, Macpeak & Seas

[57] ABSTRACT

A wire electrode feeding apparatus for an electrodischarge machine uses a motor-driven capstan roller to feed the wire electrode from a bobbin. A pinch roller presses the wire electrode against the capstan roller with a pressure that can be adjusted by a pressure adjusting mechanism. A pre-tension motor applies torque to the bobbin to resist the unwinding of the wire electrode. A control unit adjusts the pressure of the pinch roller and the torque of the pre-tension motor according to the diameter of the wire electrode, so that the wire electrode is not deformed and does not slip or snarl.

13 Claims, 2 Drawing Sheets

WIRE ELECTRODE FEEDING APPARATUS

BACKGROUND OF THE INVENTION

This invention relates to a wire electrode feeding apparatus for a wire electrodischarge machine.

Wire electrodischarge machines are widely used to cut metal by electrical discharge between a wire electrode and a workpiece. To commence a cutting operation, the wire electrode must be inserted through a starting hole in the workpiece and through wire guides disposed on either side of the starting hole. Insertion is normally performed automatically, using a motor-driven capstan and pinch roller to feed the wire from a bobbin.

To keep the wire electrode from unwinding from the bobbin and becoming snarled, a pre-tension motor applies a torque to the bobbin that pulls the wire electrode backward, in the direction opposite to the feeding direction. Wire feeding is also opposed by friction between the wire electrode and wire guides. The pinch roller must press the wire electrode against the capstan roller with sufficient force to overcome the pre-tension and friction forces; otherwise the wire electrode will slip on the capstan roller and fail to feed.

If the pinch roller presses too strongly, however, it may flatten the wire electrode, causing additional friction when the wire electrode passes through the wire guides. In the worst case, friction prevents the passage of the wire electrode and the wire electrode becomes snarled at a point between the capstan roller and wire guides. Automatic feeding is then completely disabled; human intervention is required to recover normal operation.

The ideal pressure that should be exerted by the pinch roller depends on the diameter of the wire electrode, and the pre-tension should be adjusted according to the pinch-roller pressure and wire diameter. Prior-art wire electrode feeding apparatus, however, has lacked means of adjusting the pinch-roller pressure and pre-tension, so the problems of slipping and snarling described above have frequently occurred in practice.

SUMMARY OF THE INVENTION

An object of this invention is accordingly to feed a wire electrode reliably, without slipping or snarling.

A wire electrode feeding apparatus for feeding a wire electrode from a bobbin comprises a capstan roller, a feed motor for rotationally driving the capstan roller, a pinch roller for pressing the wire electrode against the capstan roller, pressure adjusting means for adjusting the pressure of the pinch roller, a pre-tension motor for applying torque to the bobbin to resist the unwinding of the wire electrode, and a control unit for controlling the pressure adjusting means and pre-tension motor.

DETAILED DESCRIPTION OF THE EMBODIMENTS

A novel wire electrode feeding apparatus for feeding a wire electrode from a bobbin in a wire electrodischarge machine will be described below with reference to the drawings.

Figure 1:
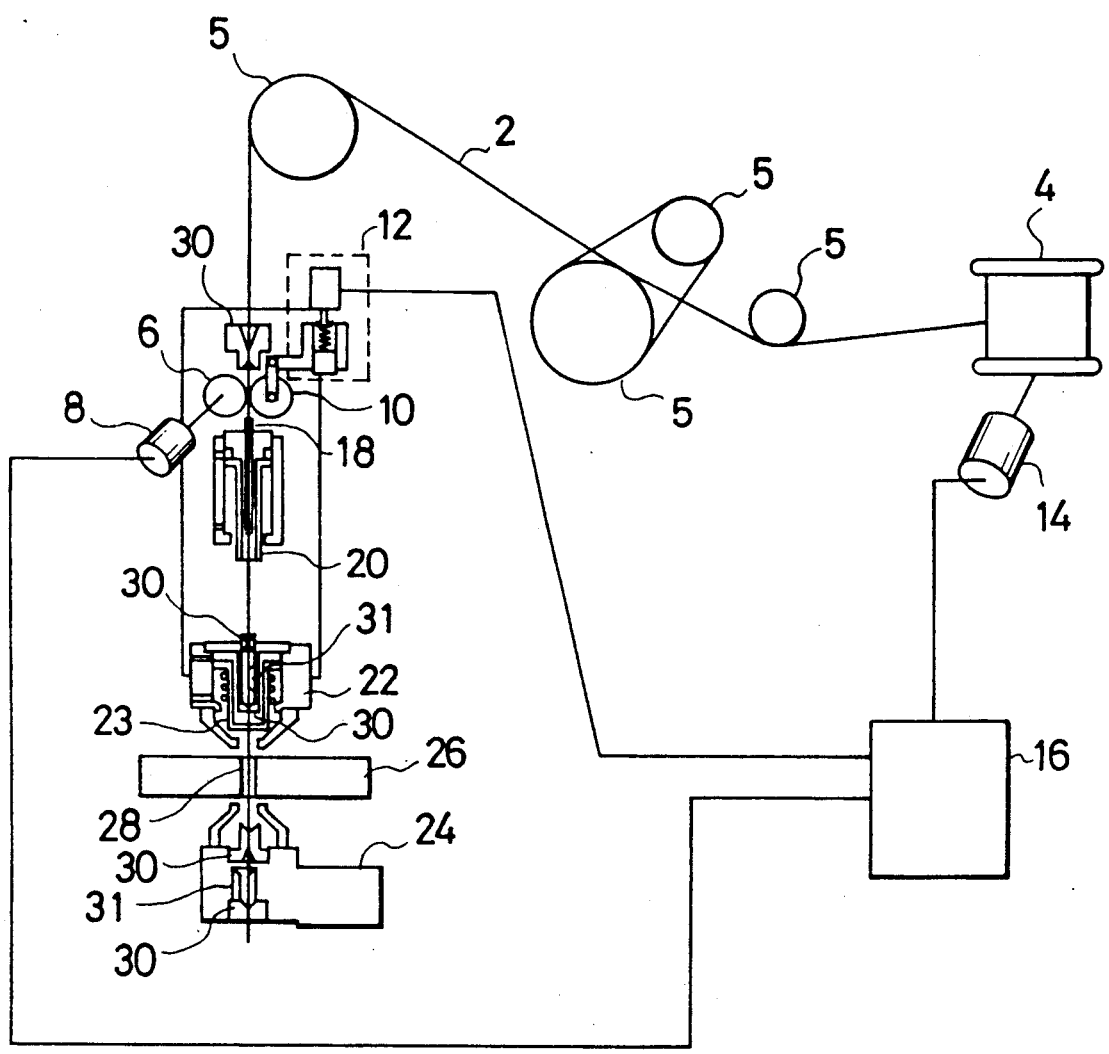
FIG. 1 is a general view of a novel wire electrode feeding apparatus.

With reference to FIG. 1, the wire electrode 2 is wound on the bobbin 4 from which it is fed via pulleys 5. The wire electrode feeding apparatus comprises a capstan roller 6 which is rotationally driven by a feed motor 8, and a pinch roller 10 for pressing the wire electrode 2 against the capstan roller 6 with a pressure adjustable by a pressure adjusting means 12. The wire electrode feeding apparatus also comprises a pre-tension motor 14 for applying torque to the bobbin 4 in a direction that resists the unwinding of the wire electrode 2, and a control unit 16 for controlling the feed motor 8, the pressure adjusting means 12, and the pre-tension motor 14.

The control unit 16 is, for example, a well-known numerical control device into which parameters such as the diameter of the wire electrode 2 are entered before the start of operation. The control unit 16 controls the pressure applied by the pinch roller 10 to the wire electrode 2, and the torque applied by the pre-tension motor 14 to the bobbin 4. The torque can be controlled by, for example, controlling the voltage supplied to the pre-tension motor. A method of controlling the pressure of the pinch roller 10 will be described later.

Other parts of the electrodischarge machine associated with wire electrode feeding include a first pipe guide 18, a second pipe guide 20, a first wire guide 22, a jet nozzle 23, and a second wire guide 24. The wire electrode feeding process can be briefly described as follows.

At the end of a previous cutting operation, the wire electrode is cut at a point between the second pipe guide 20 and the first wire guide 22. When a new workpiece 26 has been set in place, the second pipe guide 20 is moved down to form a closed path from the first pipe guide 18 to the first wire guide 22; then the control unit 16 commands the feed motor 8 to drive the capstan roller 6, which feeds the wire electrode 2 through the first wire guide 22 to the jet nozzle 23. As the feed motor 8 continues to drive the capstan roller 6, a water jet guides the wire electrode 2 through a starting hole 28 in the workpiece 26 to the second wire guide 24. The wire electrode 2 is then fed through the second wire guide 24 to a take-up mechanism not shown in the drawing. As it is fed, the wire electrode 2 must pass through narrow apertures in the jet nozzle 23 and in guide dies 30 disposed in the first wire guide 22, in the second wire guide 24, and between the capstan roller 6 and the pulleys 5.

The natural stiffness of the wire electrode 2 would tend to make the wire electrode 2 unwind from the bobbin 4, come loose from the pulleys 5, and become snarled; the torque applied by the pre-tension motor 14 prevents this from happening. The stiffness of the wire electrode 2 depends on its diameter, so the control unit 16 controls the torque according to the diameter, increasing the torque for large wire electrode diameters such as 0.2 mm and reducing it for small wire electrode diameters such as 0.1 mm.

The control unit 16 also controls the pressure of the pinch roller 10 according to the wire electrode diameter. For large diameters, the pressure is increased, enabling the capstan roller 6 and pinch roller 10 to overcome the increased torque of the pre-tension motor 14 and friction occurring at the guide dies 30. For small diameters, the pressure is reduced to avoid deforming the wire electrode 2, the reduced pressure being sufficient to overcome the friction and the reduced torque of the pre-tension motor 14.

By automatically adjusting both the torque of the pre-tension motor 14 and the pressure of the pinch roller 10 according to the diameter of the wire electrode 2, the novel wire electrode feeding apparatus avoids the problems of slipping and snarling that occurred in the prior art, assuring successful insertion of the wire electrode 2. After the wire electrode 2 has been fed through the second wire guide 24 and acquired by the take-up mechanism, cutting current is applied through electrical feeders 31 in the first and second wire guides 22 and 24, and cutting begins.

Next, a more detailed description of the pressure adjusting means 12 will be given with reference to FIGS. 2 and 3.

Figure 2:
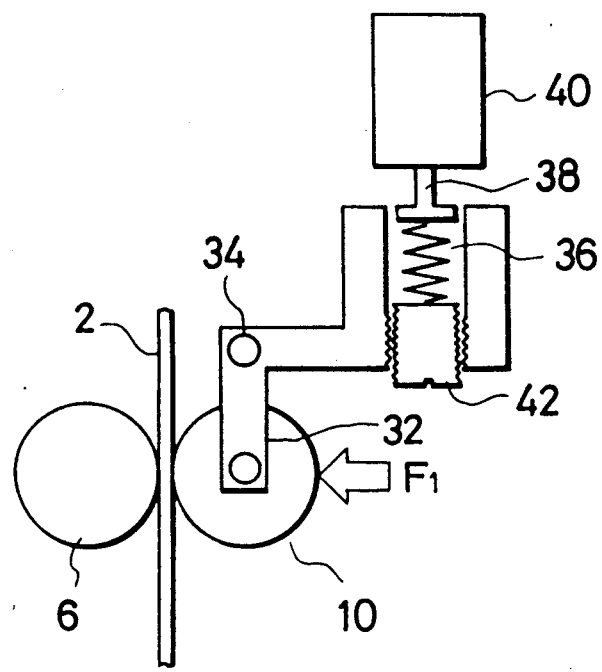
FIG. 2 is a more detailed view of the pressure adjusting means, illustrating the off state.

With reference to FIG. 2, the pressure adjusting means comprises a supporting arm 32 for supporting the pinch roller 10, a pin 34 for rotatably supporting the supporting arm 32, a compression spring 36 for exerting force on the supporting arm 32, a piston 38 for compressing the compression spring 36, and a cylinder 40, controlled by the control unit 16, for driving the piston 38. The cylinder 40 is, for example, a pneumatic cylinder which the control unit 16 controls by switching a supply of compressed air, not shown in the drawings, on or off. When the compressed air supply is switched off, the compression spring 36 extends, pushing the piston 38 upward in the drawing, into the cylinder 40. In its extended state the compression spring 36 exerts a relatively small force on the supporting arm 32. The pressure F1 of the pinch roller 10 against the capstan roller 6 is thus comparatively small.

Figure 3:
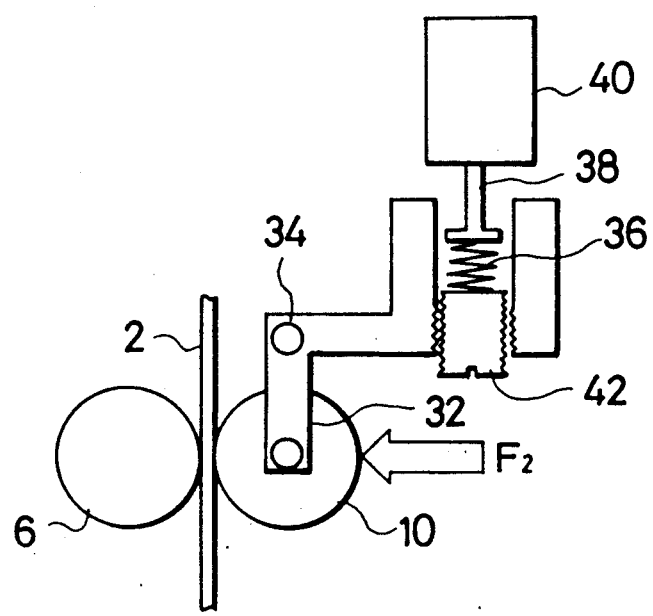
FIG. 3 is a more detailed view of the pressure adjusting means, illustrating the on state.

With reference to FIG. 3, when the compressed air supply is switched on, the cylinder 40 drives the piston 38 down, compressing the compression spring 36 so that it exerts a stronger force on the supporting arm 32. The pressure F2 of the pinch roller 10 is then comparatively large.

The supporting arm 32 has a setscrew for adjusting the force exerted by the compression spring 36. As shown in the drawings, the compression spring 36 is disposed in a threaded hole at the end of the supporting arm 32 distant from the pinch roller 10, the setscrew 42 forming one end of the hole. Turning the setscrew 42 increases or reduces the distance to the piston 38, thus increasing or reducing the compression of the compression spring 36. The setscrew 42 can be adjusted by the manufacturer of the electrodischarge machine according to the strength of the compression spring 36, and by the user according to the wire electrode diameters used.

The scope of this invention is not limited to the apparatus shown in the drawings, but includes many modifications and variations which will apparent to one skilled in the art. The cylinder 40, for example, may be a hydraulically operated cylinder instead of a pneumatic cylinder, and instead of two-level on-off control, a multiple-level control scheme can be employed to adjust the pressure of the pinch roller more closely to the diameter of the wire electrode. The general structure of the pressure adjusting means 12 is moreover not restricted to the structure shown in FIGS. 2 and 3; any structure permitting adjustment of the pinch roller pressure can be used. The control unit 16 may furthermore control the pressure and torque according not only to the diameter of the wire electrode but also to other factors such as the material of which the wire electrode is made.

What is claimed is:

1. A wire electrode feeding apparatus for feeding a wire electrode from a bobbin, comprising:
   a capstan roller;
   a feed motor for rotationally driving said capstan roller;
   a pinch roller for pressing said wire electrode against said capstan roller with a certain pressure;
   pressure adjusting means for adjusting said pressure of said pinch roller,
   a pre-tension motor for applying torque to said bobbin to resist unwinding of said wire electrode; and
   a control unit for controlling said pressure adjusting means and said pre-tension motor, in such a manner that said pressure is increased as said torque is increased, and said pressure is decreased when said torque is decreased.

2. The apparatus of claim 1, wherein said control unit controls said pressure adjusting means and said pre-tension motor according to a wire electrode diameter.

3. The apparatus of claim 2, wherein said pressure and said torque are increased when said wire electrode diameter is relatively large, and reduced when said wire electrode diameter is relatively small.

4. The apparatus of claim 1, wherein said pressure adjusting means further comprises:
   a pin for rotatably supporting said supporting arm;
   said cylinder being controlled by said control unit, for driving said piston.

5. The apparatus of claim 4, wherein said cylinder is a pneumatic cylinder.

6. The apparatus of claim 5, wherein said control unit controls said cylinder by switching an air supply on or off.

7. The apparatus of claim 4, wherein said supporting arm has a setscrew for adjusting the force exerted by said compression spring.

8. The apparatus of claim 7, wherein said compression spring is disposed in a hole of said supporting arm, said setscrew forming one end of said hole.

9. A wire electrode feeding apparatus for feeding a wire electrode from a bobbin, comprising:
   a capstan roller;
   a feed motor for rotationally driving said capstan roller;
   a pinch roller for pressing said wire electrode against said capstan roller with a certain pressure;
   pressure adjusting means for adjusting said pressure of said pinch roller, comprising: a support arm for supporting said pinch roller,
   a compression spring for exerting force on said supporting arm,
   a piston, driven by a cylinder, for compressing said compression spring,
   a pre-tension motor for applying torque to said bobbin to resist unwinding of said wire electrode; and
   a control unit for controlling said pressure adjusting means and said pre-tension motor, wherein said control unit controls an amount of pressure applied to said pinch roller during all operations.

10. The apparatus of claim 9, wherein said cylinder is a hydraulically operated cylinder, which applies multiple pressure levels to said pinch roller according to a diameter of said wire electrode.

11. A method of controlling a wire electrode feeding apparatus for feeding a wire electrode from a bobbin, having a capstan roller, a feed motor for rotationally driving said capstan roller, a pinch roller for pressing said wire electrode against said capstan roller with a certain pressure, pressure adjusting means for adjusting said pressure of said pinch roller, a pre-tension motor for applying torque to said bobbin to resist unwinding of said wire electrode, and a control unit for controlling said pressure adjusting means and said pre-tension motor, said method comprising the steps of;

entering, into the control unit, data relating to the diameter or stiffness of the wire electrode to be fed;
 controlling, in accordance with said data that has been entered, said pressure and said torque in such a manner that said pressure is increased as said torque is increased, and said pressure is decreased when said torque is decreased.

12. The method of claim 11, wherein said pressure and said torque are increased when said wire electrode diameter is relatively large, and reduced when said wire electrode diameter is relatively small.

13. The method of claim 11, wherein said pressure and said torque are increased when the stiffness of said wire electrode is relatively large, and reduced when said stiffness is relatively small.

* * * * *